(12) United States Patent
Kim et al.

(10) Patent No.: US 12,337,692 B2
(45) Date of Patent: Jun. 24, 2025

(54) COOLING SYSTEM FOR VEHICLE DRIVEN BY IN-WHEEL MOTOR

(71) Applicants: Hyundai Motor Company, Seoul (KR); Kia Corporation, Seoul (KR)

(72) Inventors: Yeon Ho Kim, Seoul (KR); Jae Yeon Kim, Hwaseong-si (KR); Ho Young Jeong, Daegu (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 492 days.

(21) Appl. No.: 18/052,343

(22) Filed: Nov. 3, 2022

(65) Prior Publication Data

US 2023/0182560 A1    Jun. 15, 2023

(30) Foreign Application Priority Data

Dec. 10, 2021    (KR) .................. 10-2021-0176213

(51) Int. Cl.
*B60K 7/00*       (2006.01)
*B60K 11/02*      (2006.01)

(52) U.S. Cl.
CPC ............ *B60K 7/0007* (2013.01); *B60K 11/02* (2013.01)

(58) Field of Classification Search
CPC .............................. B60K 7/0007; B60K 11/02
USPC ......................................................... 310/54
See application file for complete search history.

(56) References Cited

U.S. PATENT DOCUMENTS

| | | | |
|---|---|---|---|
| 9,487,092 B2 | 11/2016 | Yamada | |
| 10,938,278 B2 | 3/2021 | Tominaga | |
| 2008/0019850 A1* | 1/2008 | Tajima | B60L 1/02 310/179 |
| 2013/0161104 A1 | 6/2013 | Akamatsu | |
| 2017/0203670 A1* | 7/2017 | Morinaga | B60L 3/12 |
| 2018/0339583 A1* | 11/2018 | Hirai | B60L 9/18 |
| 2023/0182560 A1* | 6/2023 | Kim | B60K 11/02 310/54 |

FOREIGN PATENT DOCUMENTS

| | | |
|---|---|---|
| JP | 2009241911 A | 10/2009 |
| JP | 2011114947 A | 6/2011 |
| JP | 2017100700 A | 6/2017 |
| JP | 2020147069 A | 9/2020 |

\* cited by examiner

*Primary Examiner* — Rashad H Johnson
(74) *Attorney, Agent, or Firm* — MCDONNELL BOEHNEN HULBERT & BERGHOFF LLP (57) ABSTRACT

A cooling system for a vehicle driven by in-wheel motors includes a cooling water channel provided in an in-wheel motor mounted on a wheel of a vehicle so that cooling water for cooling the in-wheel motor can pass through the cooling water channel, a cooling water channel provided in an inverter for driving and controlling the in-wheel motor so that cooling water for cooling the inverter can pass through the cooling water channel, a radiator provided to dissipate heat of cooling water that has cooled the in-wheel motor and the inverter by passing the cooling water, a cooling water circulation line connected such that cooling water can circulate between the cooling water channel of the in-wheel motor, the cooling water channel of the inverter, and the radiator, and a water pump configured to circulate cooling water through the cooling water circulation line by pumping cooling water in the cooling water circulation line.

20 Claims, 5 Drawing Sheets

COOLING SYSTEM FOR VEHICLE DRIVEN BY IN-WHEEL MOTOR

CROSS REFERENCE TO RELATED APPLICATIONS

The present application claims priority to Korean Patent Application No. 10-2021-0176213, filed Dec. 10, 2021, the entire contents of which is incorporated herein for all purposes by this reference.

TECHNICAL FIELD

The present disclosure relates to a cooling system for a vehicle driven by in-wheel motors and, more particularly, to a cooling system for a vehicle driven by in-wheel motors, the cooling system being able to effectively cool in-wheel motors mounted in wheels, respectively, and inverters using cooling water.

BACKGROUND

An electric vehicle is an eco-friendly vehicle that does not discharge exhaust gas. Such an electric vehicle is necessarily equipped with a high-voltage battery that supplies energy for driving, an inverter that converts DC power output from the high-voltage battery into AC power, a motor that drives the vehicle by generating torque using AC power from the inverter, etc.

The powertrain commercialized for electric vehicles and well known up to now is configured such that power (torque) of a motor is reduced through a reducer and then transmitted to wheels through a driving axle to drive the vehicle.

Further, an in-wheel motor (IWM) system that directly transmits power from motors, which are installed in the rims for mounting tires of wheels, to the wheels has been recently spotlighted. An electric vehicle equipped with in-wheel motors is not equipped with an intermediate power transmission device such as a reducer or a differential gear, so the weight of the vehicle can be reduced.

Further, since some devices are removed, there is an advantage that the space that is occupied by the driving system of a vehicle can be greatly reduced and the loss of energy in the power transmission process can be reduced (fuel efficiency is improved).

Further, recently, study and development of an electronic corner module (E-corner module) configured by modularizing all of wheels, in-wheel motors that are driving devices, inverters, a braking system, a steering system, and a suspension system are being actively conducted.

When an E-corner module is applied to a vehicle, the E-corner module itself becomes a driving system that can independently steer wheels, so there is an advantage that responsiveness and driving stability of wheels are improved. Further, since it is possible to independently control the wheels of a vehicle for driving and steering, the turn radius when the vehicle is turned can be considerably decreased.

Meanwhile, in in-wheel motors mounted on the wheel of a vehicle, Joule heat, etc. are generated by resistance when a current flows through the coil of a stator and the heat generated by the in-wheel motors increases the temperature of parts, thereby greatly reducing the expectation lifespan of the in-wheel motors. Since heat generated by an in-wheel motor has adverse influence on the performance and durability of the motor, as described above, appropriate cooling is required.

There are several heat sources at each of wheels of a vehicle equipped with in-wheel motors, that is, an in-wheel-motor vehicle, that is, for example, a braking system, tires, etc. may act as heat sources. Heat generated by friction between a pad and a friction member of a braking system may be transmitted to in-wheel motors in braking and heat generated at tires due to friction with the road surface when a vehicle is driven may be transmitted to in-wheel motors.

Accordingly, it is required to configure an optimal cooling system for the in-wheel motor mounted on each wheel in consideration of several factors that are different especially in such an in-wheel-motor vehicle.

In the related art, there has been known a method in the related art that dissipates heat using heat transfer through convection with external air in a motor housing when heat is transmitted to the motor housing in order to cool an in-wheel motor, but this method has a defect that the cooling efficiency is very low.

Further, a method of cooling an in-wheel motor using oil has been known, but this oil-cooling method requires a device for cooling oil that has cooled an in-wheel motor, that is, a specific oil cooler.

SUMMARY

Accordingly, the present disclosure has been made in an effort to solve the problems described above and an objective of the present disclosure is to provide a cooling system for a vehicle driven by in-wheel motors, the cooling system having a water-cooling type cooling circuit for effectively cooling in-wheel motors, which are mounted in wheels of a vehicle, respectively, and inverters using cooling water.

The objectives of the present disclosure are not limited to those described above and other objectives not stated herein would be apparently understood by those who have ordinary skills in the art that the present disclosure belongs to (hereafter, 'those skilled in the art') from the following description.

In order to achieve the objective, according to an embodiment of the present disclosure, the cooling system for a vehicle driven by in-wheel motors is provided. The cooling system includes: a cooling water channel provided in an in-wheel motor mounted on a wheel of a vehicle so that cooling water for cooling the in-wheel motor can pass through the cooling water channel; a cooling water channel provided in an inverter for driving and controlling the in-wheel motor so that cooling water for cooling the inverter can pass through the cooling water channel; a radiator provided to dissipate heat of cooling water that has cooled the in-wheel motor and the inverter by passing the cooling water; a cooling water circulation line connected such that cooling water can circulate between the cooling water channel of the in-wheel motor, the cooling water channel of the inverter, and the radiator; and a water pump configured to circulate cooling water through the cooling water circulation line by pumping cooling water in the cooling water circulation line.

Therefore, according to the cooling system for a vehicle driven by in-wheel motors, it is possible to effectively cool in-wheel motors mounted on the wheels of a vehicle, respectively, and inverters using cooling water. In particular, there is no need for an oil cooler that is used to cool oil in an oil-cooling type.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Description of specific structures and functions disclosed in embodiments of the present disclosure are only an example for describing the embodiments according to the concept of the present disclosure and the embodiments according to the concept of the present disclosure may be implemented in various ways. The present disclosure is not limited to the embodiments described herein and should be construed as including all changes, equivalents, and replacements that are included in the spirit and the range of the present disclosure.

It will be understood that, although the terms first and/or second, etc. may be used herein to describe various elements, but these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Like reference numerals indicate the same components throughout the specification. The terms used herein are provided to describe embodiments without limiting the present disclosure. In the specification, a singular form includes a plural form unless specifically stated in the sentences. The terms "comprise" and/or "comprising" used herein do not exclude that another component, step, operation, and/or element exist or are added in the stated component, step, operation, and/or element.

Embodiments of the present disclosure will be described hereafter in detail with reference to the accompanying drawings.

Figure 1:
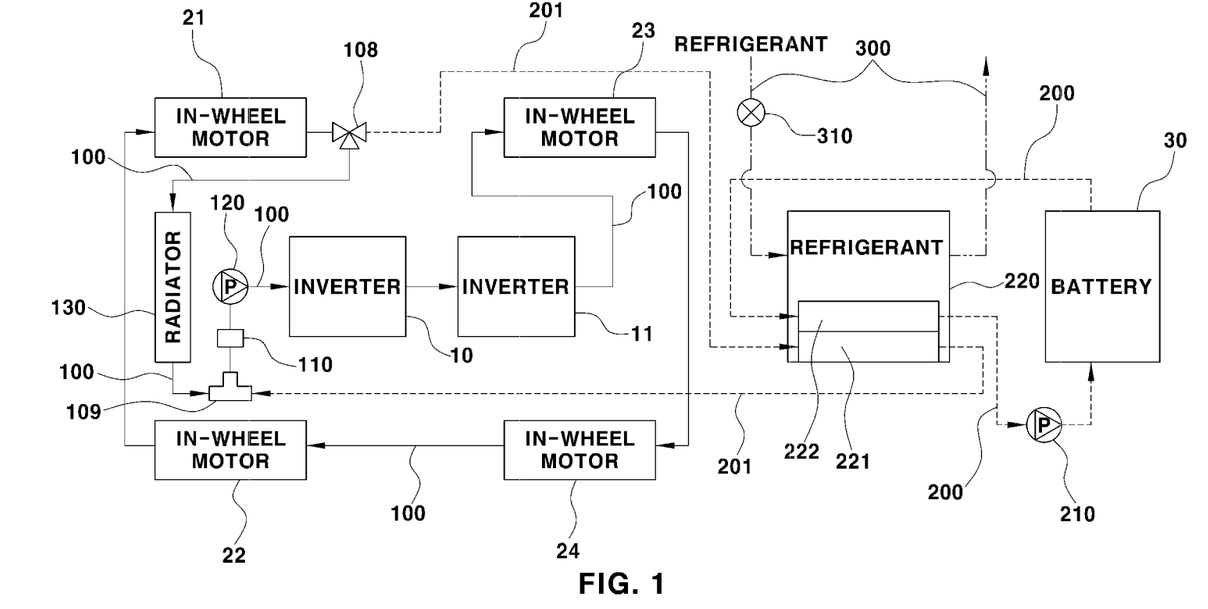
FIG. 1 is a circuit diagram showing a cooling system for a vehicle driven by in-wheel motors according to a first embodiment of the present disclosure.

FIG. 1 is a circuit diagram showing a cooling system for a vehicle driven by in-wheel motors according to a first embodiment of the present disclosure.

Referring to FIG. 1, in-wheel motors 21 to 24 mounted on four wheels of a vehicle, that is, the left wheel and the right wheel of the front wheels and the left wheel and the right wheel of the rear wheels, respectively, are shown.

As shown in the figure, the vehicle is equipped with a front-wheel inverter 10 and a rear-wheel inverter 11 for driving and controlling the in-wheel motors 21 to 24, and the front-wheel inverter 10 converts DC power output from a battery 30 into AC power and applies the AC power to the front-wheel in-wheel motors 21 and 22. The rear-wheel inverter 11 converts DC power output from the battery 30 into AC power and applies the AC power to the rear-wheel in-wheel motors 23 and 24.

The front-wheel inverter 10 and the rear-wheel inverter 11 shown in FIG. 11 are mounted on the car body rather than wheels. The inverters 10 and 11 each have power modules for driving and controlling the right-wheel in-wheel motors 21 and 23 and the left-wheel in-wheel motors 22 and 24, and each of the power modules includes switching devices for converting DC into AC.

The in-wheel motors 21 to 24 and the inverters 10 and 11, which are devices that are operated by electricity in the vehicle, are all device that generate heat when they are operated, and are devices that need to be cooled to secure performance and durability.

The cooling system for a vehicle driven by in-wheel motors according to the first embodiment of the present disclosure is a water-cooling type cooling system that uses cooling water that circulates along a cooling water circulation line 100 to cool devices (in-wheel motors and inverters).

Further, the cooling system according to the first embodiment of the present disclosure includes a power electronic (PE) cooling circuit for cooling the in-wheel motors 21 to 24 and the inverters 10 and 11, and a battery cooling circuit for cooling the battery 30 that supplies operation power for the in-wheel motors and the inverters.

The PE cooling circuit includes cooling water channels provided so that cooling water can pass through the in-wheel motors 21 to 24 and the inverters 10 and 11, and the cooling water channels are provided so that cooling water passing through the cooling water channels in the in-wheel motors 21 to 24 and the inverters 10 and 11 can cool corresponding devices, that is, cooling water passing through the cooling water channels can absorb heat generated by corresponding devices.

For example, the cooling water channels for cooling the in-wheel motors 21 to 24 and the inverters 10 and 11 may be configured by forming passages through which cooling water can pass in the housings of the in-wheel motors and the inverters.

The PE cooling circuit further includes a cooling water circulation line 100 that connects the cooling water channels of the in-wheel motors 21 to 24 and the inverters 10 and 11, a water pump 120 that circulates cooling water by pumping cooling water in the cooling water circulation line 100, and a heat exchanger radiator 130 that dissipates heat of the cooling water, which circulates along the cooling water circulation line 100, to the outside.

The water pump 120 may be an electric water pump that is operated by power from the battery 30 and operation of the water pump 120 can be controlled in response to a control signal from a controller not shown.

The radiator 130, which constitutes a cooling module in cooperation with a cooling fan not shown, may be installed at the front of the vehicle with the cooling fan. In the radiator 130, cooling water passing through the radiator 130 exchanges heat with surrounding air, and the cooling water is cooled by this heat exchange.

The PE cooling circuit may further include a reservoir tank 110 in which cooling water is stored. The reservoir tank 110 may be disposed at the front end (upstream side) of the water pump 120 in the cooling water circulation line 100.

The battery cooling circuit includes a cooling water channel provided so that cooling water can pass through the battery. This cooling water channel is provided so that cooling water passing through the cooling water channel can cool the battery 30, that is, cooling water passing through the cooling water channel can absorb heat generated by the battery.

The battery cooling circuit may further includes a chiller 220 through which an air conditioner refrigerant passes, and a cooling water circulation line 200 connected between the battery 30 and the chiller 220 so that cooling water can circulates.

The battery cooling circuit may further include a water pump 210 that circulate cooling water by pumping cooling water in the cooling water circulation line 200. The water pump 210 of the battery cooling circuit may also be an electric water pump that is operated by power from the battery and operation of the water pump 210 can be controlled in response to a control signal from a controller.

The chiller 220 is a heat exchanger where cooling water and a refrigerant exchange heat with each other, a connection line 201 diverging from the cooling water circulation line 100 of the PE cooling circuit, the cooling water circulation line 200 of the battery cooling circuit, and a refrigerant line 300 are connected to the chiller 220 for heat exchange of cooling water and a refrigerant.

The refrigerant line 300 may diverge from a main refrigerant line (not shown) of an air-conditioning system and is connected to refrigerant inlet and outlet of the chiller 220. Accordingly, a refrigerant distributed from the main refrigerant line of the air-conditioning system can pass through the chiller 220 while moving along the refrigerant line 300.

An expansion valve 310 that expands a high-temperature and high-pressure refrigerant compressed and supplied by a compressor (not shown) of the air-conditioning system into low-temperature and low-pressure is installed at the refrigerant inlet of the chiller 220, and the low-temperature and low-pressure refrigerant that has passed through the expansion valve 310 is supplied to the chiller 220 and exchanges heat with cooling water.

The chiller 220 has a heat exchange passage that passes cooling water to exchange heat with a refrigerant. The heat exchange passage includes a first heat exchange passage 221 to which the connection line 201 diverging from the cooling water circulation line 100 of the PE cooling circuit is connected and a second heat exchange passage 222 to which the cooling water circulation line 200 of the battery cooling circuit is connected.

In the PE cooling circuit, the connection line 201 diverges from the cooling water circulation line 200 at the front end (the upstream side, the inlet) of the radiator 130 and is connected to the cooling water inlet (the inlet of the first heat exchange passage) of the chiller 220. The connection line 201 connected to the cooling water inlet of the chiller 220 is connected and joined to the cooling water circulation line 200 at the rear end (the downstream side, the outlet) of the radiator 130.

A 3-way valve 108 that is a multi-way valve of which the opening state is controlled by a controller is installed at the point where the connection line 201 diverges from the cooling water circulation line 100 at the front end of the radiator 130.

The connection line 201 connected to the cooling water outlet (the outlet of the first heat exchange passage) of the chiller 220 is joined to the cooling water circulation line 100 at the rear end (the downstream side, the inlet) of the radiator 130 through a connector 109.

The 3-way valve 108 is provided to control flow of cooling water, that is, is provided to control flow of cooling water in the cooling water circulation line 100 connected to the radiator 130 and the connection line 201 connected to the chiller 220.

For example, when an internal passage of the 3-way valve 108 to which the cooling water circulation line 100 going to the radiator is connected is opened, cooling water that has passed through the 3-way valve 108 flows to the radiator 130 through the cooling water circulation line 100. When an internal passage to which the connection line 201 going to the chiller 220 is opened, cooling water that has passed through the 3-way valve 108 flows to the chiller 220 through the connection line 201.

As described above, the 3-way valve 108 is installed in the cooling water circulation line 100 at the front end of the radiator 130, and in this case, high-temperature cooling water that has absorbed heat from corresponding devices while cooling the inverters 10 and 11 and the in-wheel motors 21 to 24 passes through the 3-way valve 108.

If the internal passage of the 3-way valve 108 to which the connection line 201 going to the chiller 220 is opened, high-temperature cooling water flows to the connection line 201 and passes through the first heat exchange passage 221 of the chiller 220 after moving along the connection line 201.

The high-temperature cooling water moving to the chiller 220, as described above, can exchange heat with the air-conditioning refrigerant while passing through the first heat exchange passage 221, and in this case, the heat of the cooling water can transfer to the air-conditioning refrigerant relatively low temperature. Accordingly, the 3-way valve and the connection line function as parts of a heat pump system.

The cooling water that has passed through the first heat exchange passage 221 of the chiller 220 flows through the connection line 201 and joins cooling water in the cooling water circulation line 100 at the rear end (the downstream side, the outlet) of the radiator 130 through the connector 109.

In the cooling system according to the first embodiment, the PE cooling circuit has a configuration in which devices are all connected in series for the radiator 130 by the cooling water circulation line 100.

In the following description, the in-wheel motor 21 installed at the right wheel of the front wheels is referred to as 'front wheel-right wheel in-wheel motor' and the in-wheel motor 22 installed at the left wheel of the front wheels is referred to as a 'front wheel-left wheel in-wheel motor'. Similarly, the in-wheel motor 23 installed at the right wheel of the rear wheels is referred to as 'rear wheel-right wheel in-wheel motor' and the in-wheel motor 24 installed at the left wheel of the rear wheels is referred to as a 'rear wheel-left wheel in-wheel motor'.

In the cooling system according to the first embodiment, since the cooling water circulation line 100 of the PE cooling circuit sequentially connects the in-wheel motors 21 to 24 and the inverters 10 and 11 in series, cooling water pumped by the water pump 120 sequentially passes the front-wheel inverter 10, the rear-wheel inverter 11, the rear wheel-right wheel in-wheel motor 23, the rear wheel-left wheel in-wheel motor 24, the front wheel-left wheel in-wheel motor 22, and the front wheel-right wheel in-wheel motor 21. The cooling order of the devices is the same as the order in which the cooling water passes the devices.

The rear wheel-right wheel in-wheel motor 23 and the rear wheel-left wheel in-wheel motor 24 are also connected with each other in series by the cooling water circulation line 100, and the front wheel-left wheel in-wheel motor 22 and the front wheel-right wheel in-wheel motor 21 are also connected with each other in series by the cooling water circulation line 100.

Accordingly, in the vehicle, the cooling water that has passed through the left-wheel in-wheel motor passes through the right-wheel in-wheel motor or the cooling water that has passed through the right-wheel in-wheel motor passes through the left-wheel in-wheel motor. Of course, the fact that cooling water passes through an in-wheel motor and an inverter means that the cooling water passes through the cooling water channel in the in-wheel motor and inverter so that the corresponding devices (the in-wheel motor and inverter) can be cooled by the cooling water.

As described above, since the PE cooling circuit has a series-type cooling circuit configuration in which cooling target devices (in-wheel motors and inverters) are all connected with each other in series through the cooling water circulation line 100, the flow rate of cooling water is the same at any point in the cooling water circulation line 100. Further, the flow rate of cooling water passing through the in-wheel motors 21 to 24 and the flow rate of cooling water passing through the inverters 10 and 11 are the same.

Figure 2:
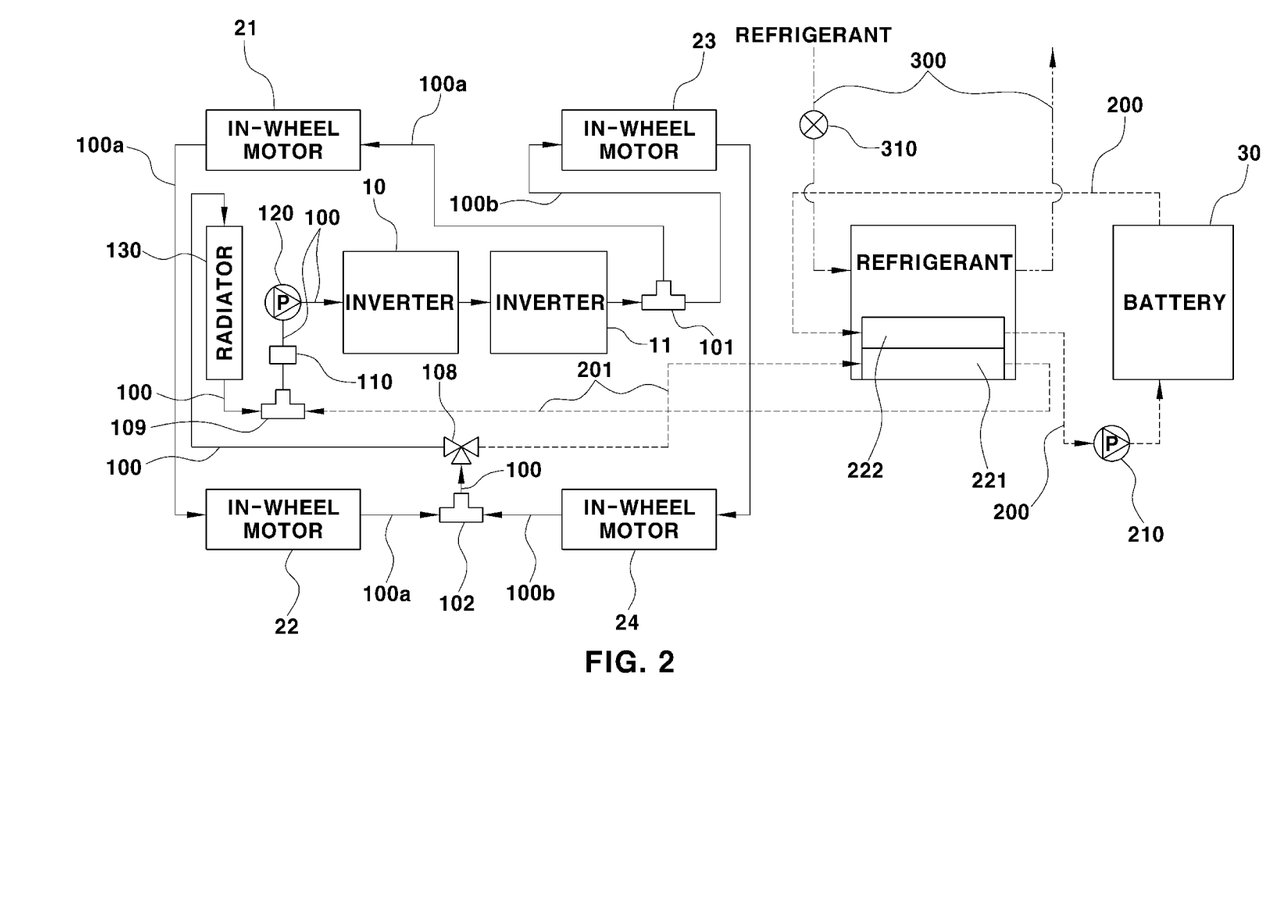
FIG. 2 is a circuit diagram showing a cooling system for a vehicle driven by in-wheel motors according to a second embodiment of the present disclosure.

Meanwhile, FIG. 2 is a circuit diagram showing a cooling system for a vehicle driven by in-wheel motors according to a second embodiment of the present disclosure.

The PE cooling circuit has a series-parallel mixed-type circuit configuration in the cooling system according to the second embodiment. That is, devices are connected both in series and in parallel by the cooling water circulation line 100 in the PE cooling circuit.

In detail, compared with the configuration of the first embodiment, there is a difference in that the front-wheel in-wheel motors 21 and 22 and the rear-wheel in-wheel motors 23 and 24 are connected with each other in parallel for the radiator 130 by cooling water circulation lines 100a and 100b.

In this case, it is not different from the first embodiment that that front-wheel inverter 10 and the rear-wheel inverter 11 are connected with each other in series by the cooling water circulation line 100, that the inverters 10 and 11 and the front-wheel in-wheel motors 21 and 22 are connected with each other in series, and that the inverters 10 and 11 and the rear-wheel in-wheel motors 23 and 24 are connected with each other in series for the radiator 130.

It is also not different from the first embodiment that the front wheel-right wheel in-wheel motor 21 and the front wheel-left wheel in-wheel motor 22 are connected with each other in series by the cooling water circulation line 100a and that the rear wheel-right wheel in-wheel motor 23 and the rear wheel-left wheel in-wheel motor 24 are connected with each other in series by the cooling water circulation line 100a.

Further, it is also not different from the first embodiment that the connection line 201 diverges from the cooling water circulation line 100 at the front end (the upstream side, the inlet) of the radiator 130 and is connected to the chiller 220 and that the 3-way valve 108 that is a multi-way valve is installed at the point where the connection line 201 diverges. However, the cooling water circulation line at the rear end (the downstream side, the outlet) of the rear inverter 11 is divided into two circulation lines 100a and 100b. That is, the cooling water circulation line at the rear end of the rear inverter 11 is divided into a front-wheel cooling water circulation line 100a and a rear-wheel cooling water circulation line 100b at the connector 101, and the diverging circulation lines 100a and 100b are connected to the in-wheel motors 21 to 24.

In this case, the front wheel-right wheel in-wheel motor 21 and the front wheel-left wheel in-wheel motor 22 are connected with each other in series by the front-wheel circulation line 100a diverging from the rear end of the rear-wheel inverter 11. Accordingly, cooling water distributed to the front-wheel circulation line 100a after passing through the rear-wheel inverter 11 sequentially passes through the front wheel-right wheel in-wheel motor 21 and the front wheel-left wheel in-wheel motor 22.

Further, the rear wheel-right wheel in-wheel motor 23 and the rear wheel-left wheel in-wheel motor 24 are connected with each other in series by the rear-wheel circulation line 100b diverging from the rear end of the rear-wheel inverter 11. Accordingly, cooling water distributed to the rear-wheel circulation line 100b after passing through the rear-wheel inverter 11 sequentially passes through the rear wheel-right wheel in-wheel motor 23 and the rear wheel-left wheel in-wheel motor 24.

Further, the front-wheel circulation line 100a and the rear-wheel circulation line 100b join as one cooling water circulation line 100 at the rear end of the front-wheel in-wheel motor (front wheel-left wheel in-wheel motor) 22 and the rear end of the rear-wheel in-wheel motor (rear wheel-left wheel in-wheel motor) 24, and the one cooling water circulation line 100 is connected to the cooling water inlet of the radiator 130.

Further, the connection line 201 diverges from the one cooling water circulation line 100 and is connected to the cooling water inlet of the chiller 220 (the inlet of the first heat exchange passage) and the 3-way valve 108 is installed at the point where the connection line 201 diverges from the cooling water circulation line 100.

The 3-way valve 108, which is an electronic valve of which the opening state is controlled by a controller, similar to the first embodiment, is provided to control flow of cooling water. That is, the 3-way valve 108 is a valve that controls flow of cooling water in the cooling water circulation line 100 connected to the cooling water inlet of the radiator 130 and the connection line 201 connected to the cooling water inlet of the chiller 220.

The connection line 201 connected from the cooling water outlet of the chiller 220 (the outlet of the first heat exchange passage) joins the cooling water circulation line 100, which is connected to the cooling water outlet of the radiator 130, through the connector 109, and the cooling water circulation line 100 that the connection line 201 joins is connected to the inlet of the water pump 120 through the reservoir tank 110.

Accordingly, cooling water pumped by the water pump 120 is distributed to the front-wheel circulation line 100a and the rear-wheel circulation line 100b after passing through the front-wheel inverter 10 and the rear-wheel inverter 11. Thereafter, the cooling water sequentially passes through the front wheel-right wheel in-wheel motor 21 and the front wheel-left wheel in-wheel motor 22 that are connected in series, and the rear wheel-right wheel in-wheel motor 23 and the rear wheel-left wheel in-wheel motor 24 that are connected in series while flowing through the front-wheel circulation line 100a and the rear-wheel circulation line 100b.

In this case, cooling water cools the inverters and the in-wheel motors while passing through the cooling water channels of the inverters 10 and 11 and the cooling water channels of the in-wheel motors 21 to 24. The cooling water that has cooled the inverters and the in-wheel motors flows to the cooling water circulation line 100 and then sequentially passes through the 3-way valve 108 and the radiator 130. Further, the cooling water passing through the radiator 130 and external air exchange heat with each other, whereby the cooling water dissipates heat and cools.

In the second embodiment, the flow rate of cooling water that is circulated through the entire PE cooling circuit by the water pump 120 may be the same as the sum of the flow rate of cooling water passing through the front-wheel in-wheel motors 21 and 22 (the flow rate of the cooling water in the front-wheel circulation line) and the flow rate of cooling water passing through the rear-wheel in-wheel motors 23 and 24 (the flow rate of cooling water in the rear-wheel circulation line).

Figure 3:
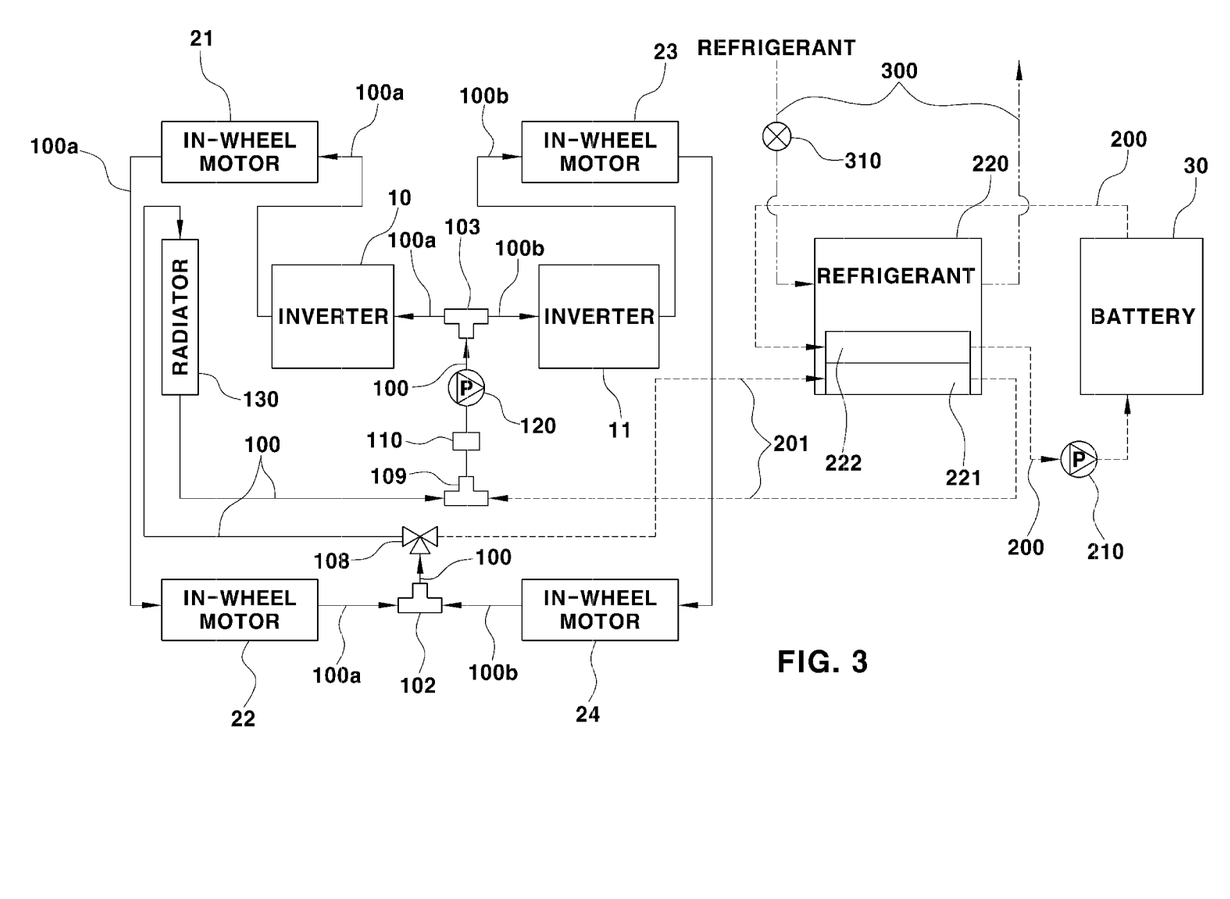
FIG. 3 is a circuit diagram showing a cooling system for a vehicle driven by in-wheel motors according to a third embodiment of the present disclosure.

Next, FIG. 3 is a circuit diagram showing a cooling system for a vehicle driven by in-wheel motors according to a third embodiment of the present disclosure.

As shown in the figure, in the cooling system according to the third embodiment, the PE cooling circuit includes a front-wheel cooling circuit and a rear-wheel cooling circuit, in which the front-wheel cooling circuit and the rear-wheel cooling circuit are connected with each other in parallel by a cooling water circulation line.

Further, the front-wheel cooling circuit has a circuit configuration in which the front-wheel inverter 10, the front wheel-right wheel in-wheel motor 21, and the front wheel-left wheel in-wheel motor 22 are connected in series by the cooling water circulation line 100a, and the rear-wheel cooling circuit has a circuit configuration in which the rear-wheel inverter 11, the rear wheel-right wheel in-wheel motor 23, and the rear wheel-left wheel in-wheel motor 24 are connected in series by the cooling water circulation line 100b.

In this case, the cooling water circulation line 100 at the outlet of the water pump 120 is divided into a front-wheel circulation line 100a and a rear-wheel circulation line 100b at the connector 103, and the front-wheel inverter 10, the front wheel-right wheel in-wheel motor 21, and the front wheel-left wheel in-wheel motor 22 are connected in series by the diverging front-wheel circulation line 100a. Further, the rear-wheel inverter 11, the rear wheel-right wheel in-wheel motor 23, and the rear wheel-left wheel in-wheel motor 24 are connected in series by the diverging rear-wheel circulation line 100b.

Of course, the diverging front-wheel circulation line 100a and the diverging rear-wheel circulation line 100b are connected to the inlet and the outlet of the cooling water channel in each device. The cooling water circulation lines 100a and 100b connected to the cooling water channel outlets of the devices (e.g., the left-wheel in-wheel motors 22 and 24) that cooling water finally passes through in the front-wheel cooling circuit and the rear-wheel cooling circuit join as one cooling circulation line through the connector 103.

The one cooling water circulation line 100 is connected to the cooling water inlet of the radiator 130 and the connection line 201 diverges from the cooling water circulation line 100 connected to the cooling water inlet of the radiator 130 and is connected to the cooling water inlet of the chiller 220 (the inlet of the first heat exchange passage).

A 3-way valve 108 that is a multi-way valve as in the first and second embodiments is installed at the point where the connection line 201 diverges from the cooling water circulation line 100 connected to the cooling water inlet of the radiator 130.

The 3-way valve 108, which is an electronic valve of which the opening state is controlled by a controller, similar to the first and second embodiments, is provided to control flow of cooling water. That is, the 3-way valve 108 is a valve that controls flow of cooling water in the cooling water circulation line 100 connected to the radiator 130 and the connection line 201 connected to the chiller 220.

The connection line 201 connected from the cooling water outlet of the chiller 220 (the outlet of the first heat exchange passage) joins the cooling water circulation line 100, which is connected to the cooling water outlet of the radiator 130, through the connector 109, and the cooling water circulation line 100 that the connection line 201 joins is connected to the inlet of the water pump 120 through the reservoir tank 110.

Accordingly, cooling water pumped by the water pump 120 is distributed to the front-wheel circulation line 100a and the rear-wheel circulation line 100b, and the cooling water distributed to the front-wheel circulation line 100a sequentially passes through the front-wheel inverter 10, the front wheel-right wheel in-wheel motor 21, and the front wheel-left wheel in-wheel motor 22 that are connected in series.

Further, the cooling water distributed to the rear-wheel circulation line 100b sequentially passes through the rear-wheel inverter 11, the rear wheel-right wheel in-wheel motor 23, and the rear wheel-left wheel in-wheel motor 24 that are also connected in series.

In this case, cooling water cools the inverters and the in-wheel motors while passing through the cooling water channels of the inverters 10 and 11 and the cooling water channels of the in-wheel motors 21 to 24. As described above, the cooling water that has cooled the inverters and the in-wheel motors flows to the cooling water circulation line 100 and then sequentially passes through the 3-way valve 108 and the radiator 130. Further, the cooling water passing through the radiator 130 and external air exchange heat with each other, whereby the cooling water dissipates heat and cools.

In the third embodiment, the flow rate of the cooling water that is circulated through the entire PE cooling circuit by the water pump may be the same as the sum of the flow rate of the cooling water flowing along the front-wheel circulation line 100a (the flow rate of the cooling in the front-wheel cooling circuit) and the flow rate of the cooling water flowing through the rear-wheel circulation line 100b (the flow rate of the cooling in the rear-wheel cooling circuit).

Figure 4:
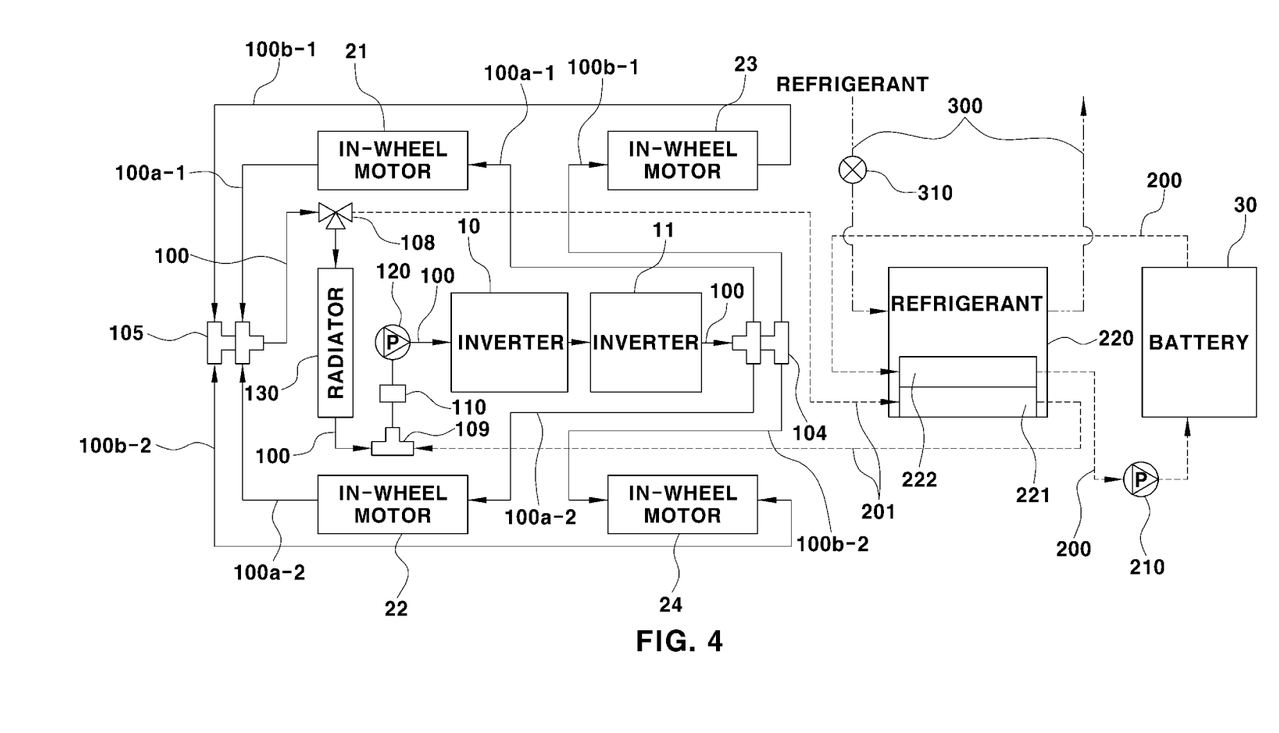
FIG. 4 is a circuit diagram showing a cooling system for a vehicle driven by in-wheel motors according to a fourth embodiment of the present disclosure.

Next, FIG. 4 is a circuit diagram showing a cooling system for a vehicle driven by in-wheel motors according to a fourth embodiment of the present disclosure.

The PE cooling circuit of a cooling system according to the fourth embodiment has a circuit configuration in which the in-wheel motors 21 to 24 mounted in wheels, respectively, that is, the front wheel-right wheel in-wheel motor 21, the front wheel-left wheel in-wheel motor 22, the rear wheel-right wheel in-wheel motor 23, and the rear wheel-left wheel in-wheel motor 24 are all connected in parallel for the radiator 130 by a cooling water circulation line.

First, it is not different from the first embodiment and the second embodiment that the front-wheel inverter 10 and the rear-wheel inverter 11 are connected in series by the cooling water circulation line 100 at the outlet of the water pump 120. Of course, the cooling water circulation line 100 is connected with the cooling water channels of the inverters 10 and 11.

That is, the cooling water circulation line 100 at the outlet of the water pump 120 is connected to the cooling water channel inlet of the front-wheel inverter 10 and the cooling water circulation line 100 connected to the cooling water outlet of the front-wheel inverter 10 is connected to the cooling water channel inlet of the rear-wheel inverter 11.

Further, the cooling water circulation line 100 connected to the cooling water channel outlet of the rear-wheel inverter 11 is divided into four circulation lines 100a-1, 100a-2, 100b-1, and 100b-2 connected from the connector 104 to the wheels, respectively. The diverging circulation lines 100a-1, 100a-2, 100b-1, and 100b-2 are connected to the cooling water channel inlets of the in-wheel motors 21 to 24 mounted on the wheels, respectively.

The circulation lines 100a-1, 100a-2, 100b-1, and 100b-2 connected to the cooling water channel outlets of the in-wheel motors 21 to 24 join as one cooling circulation line 100 through the connector 105, and the one cooling circulation line 100 is connected to the cooling water inlet of the radiator 130.

A connection line 201 diverges from the cooling circulation line 100 connected to the cooling water inlet of the radiator 130 and is connected to the cooling water inlet of the chiller 220, and similar to the first to third embodiments, the 3-way valve 108 that is a multi-way valve is installed at the point where the connecting line 201 diverges from the cooling circulation line 100.

The connection line 201 connected from the cooling water outlet of the chiller 220 joins the cooling water circulation line 100, which is connected to the cooling water outlet of the radiator 130, through the connector 109, and the cooling water circulation line 100 that the connection line 201 joins is connected to the inlet of the water pump 120 through the reservoir tank 110.

Accordingly, cooling water pumped by the water pump 120 sequentially passes through the front-wheel inverter 10 and the rear-wheel inverter 11 and is then distributed to the circulation lines 100a-1, 100a-2, 100b-1, and 100b-2 diverging to the wheels, respectively, through the connector 104. The cooling water distributed to the circulation lines 100a-1, 100a-2, 100b-1, and 100b-2 passes through the in-wheel motors 21 to 24, respectively.

In this case, cooling water cools the inverters and the in-wheel motors while passing through the cooling water channels of the inverters 10 and 11 and the cooling water channels of the in-wheel motors 21 to 24. As described above, the cooling water that has passed through the in-wheel motors in parallel flows to the cooling water circulation line 102 through the connector 105 and then sequentially passes through the 3-way valve 108 and the radiator 130. Further, the cooling water passing through the radiator 130 and external air exchange heat with each other, whereby the cooling water dissipates heat and cools.

In the fourth embodiment, the flow rate of the cooling water that is circulated through the entire PE cooling circuit by the water pump 120 may be the same as the sum of the flow rates of the cooling water distributed to flow through the diverging circulation lines 100a-1, 100a-2, 100b-1, and 100b-2.

That is, the entire flow rate may be the same as the sum of the flow rates of the cooling water passing through the in-wheel motors 21 to 24, in detail, the same as the sum of the flow rate of the cooling water passing through the front wheel-right wheel in-wheel motor 21, the flow rate of the cooling water passing through the front wheel-left wheel in-wheel motor 22, the flow rate of the cooling water passing through the rear wheel-right wheel in-wheel motor 23, and the flow rate of the cooling water passing through the rear wheel-left wheel in-wheel motor 24.

Figure 5:
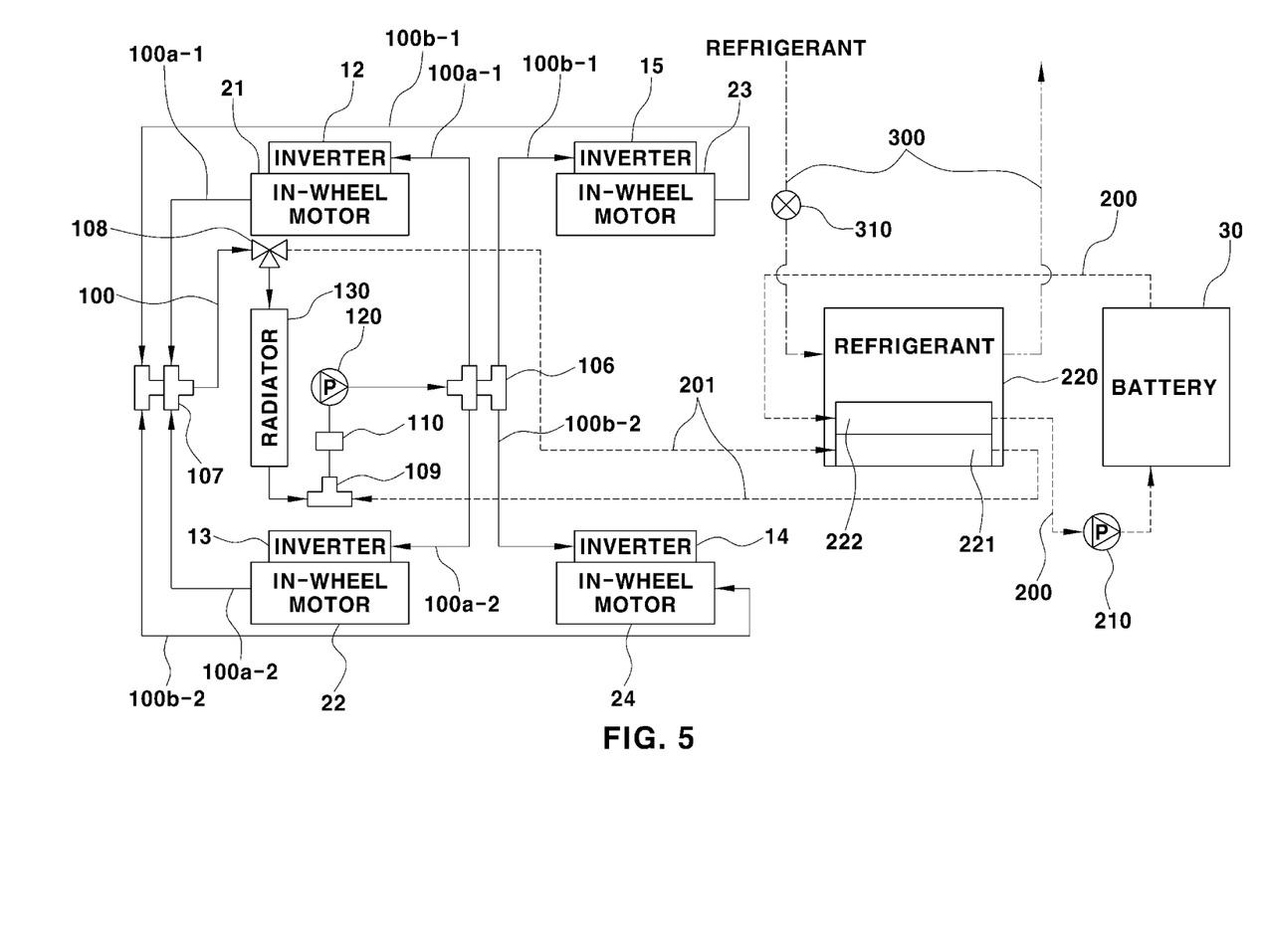
FIG. 5 is a circuit diagram showing a cooling system for a vehicle driven by in-wheel motors according to a fifth embodiment of the present disclosure.

Next, FIG. 5 is a circuit diagram showing a cooling system for a vehicle driven by in-wheel motors according to a fifth embodiment of the present disclosure.

The fifth embodiment relates to a cooling system for a vehicle in which an E-corner module is applied to each wheel. As described above, an E-corner module is obtained by modularizing wheels, and in-wheel motors, which are driving devices, inverters, a braking system, a steering system, and a suspension system.

Accordingly, in a vehicle equipped with E-corner modules, inverters 12 to 15 and in-wheel motors 21 to 24 are both mounted in wheels, so the cooling water channels of the inverters and the cooling water channels of the in-wheel motors can be connected in series.

For example, the inverters 12 to 15 and the in-wheel motors 21 to 24 may have integrated housings in wheels, respectively, and a cooling water channel of an inverter and a cooling water channel of a motor are connected directly connected in each of the integrated housings. In this structure, cooling water cools the inverters and the in-wheel motors while sequentially flowing through the cooling water channels of the inverters and the cooling water channel of the motors.

Alternatively, the inverters 12 to 15 and the in-wheel motors 21 to 24 each may have a separate housing, and the cooling water channels in the inverter housings and the cooling water channels in the motors may be connected in series through separate pipes such as hoses. In this structure as well, cooling water cools the inverters and the in-wheel motors while sequentially flowing through the cooling water channels of the inverters and the cooling water channel of the motors.

Referring to FIG. 5, the inverters 12 to 15 and the in-wheel motors 21 to 24 are mounted in wheels, respectively, thereby configuring E-corner modules. The cooling target devices of the E-corner modules applied to the wheels, respectively, are connected for the radiator 130 by cooling water circulation lines 100a-1, 100a-2, 100b-1, and 100b-2.

This parallel-type circuit configuration is described in more detail. The cooling water circulation line 100 at the outlet of the water pump 120 is divided into four circulation lines 100a-1, 100a-2, 100b-1, and 100b-2 connected from the connector 106 to the wheels, respectively. The diverging circulation lines 100a-1, 100a-2, 100b-1, and 100b-2 are connected to the cooling water channel inlets of the inverters 12 to 15 mounted on the wheels, respectively.

Further, the cooling water channels of the inverters 12 to 15 and the cooling water channels of the in-wheel motors 21 to 24 on the wheels are, as described above, connected in series, and the circulation lines 100a-1, 100a-2, 100b-1, and 100b-2 connected to the cooling water channel outlets of the in-wheel motors 21 to 24 mounted on the wheels join as one cooling water circulation line 100 through the connector 107.

The one cooling circulation line 100 is connected to the cooling water inlet of the radiator 130. Further, a connection line 201 diverges from the cooling circulation line 100 connected to the cooling water inlet of the radiator 130 and is connected to the cooling water inlet of the chiller 220, and similar to the first to fourth embodiments, the 3-way valve 108 that is a multi-way valve is installed at the point where the connecting line 201 diverges from the cooling circulation line 100.

The connection line 201 connected from the cooling water outlet of the chiller 220 joins the cooling water circulation line 100, which is connected to the cooling water outlet of the radiator 130, through the connector 109, and the cooling water circulation line 100 that the connection line 201 joins is connected to the inlet of the water pump 120 through the reservoir tank 110.

Accordingly, cooling water pumped by the water pump 120 is distributed to the circulation lines 100a-1, 100a-2, 100b-1, and 100b-2 diverging to the wheels, respectively, through the connector 106. The cooling water distributed to the circulation lines 100a-1, 100a-2, 100b-1, and 100b-2 respectively passes through the inverters 12 to 15 and the in-wheel motors 21 to 24 that are connected in parallel.

In this case, cooling water cools the inverters and the in-wheel motors while passing through the cooling water channels of the inverters 12 to 15 and the cooling water channels of the in-wheel motors 21 to 24. As described above, the cooling water that has passed through the inverters and the in-wheel motors in parallel flows to the cooling water circulation line 100 through the connector 107 and then sequentially passes through the 3-way valve 108 and the radiator 130. Further, the cooling water passing through the radiator 130 and external air exchange heat with each other, whereby the cooling water dissipates heat and cools.

In the fifth embodiment, the flow rate of the cooling water that is circulated through the entire PE cooling circuit by the water pump 120 may be the same as the sum of the flow rates of the cooling water distributed to flow through the diverging circulation lines 100a-1, 100a-2, 100b-1, and 100b-2 (the flow rates of the cooling water distributed to flow to the E-corner modules). That is, the entire flow rate may be the same as the sum of the flow rates of the cooling water passing through the inverters 12 to 15 and the in-wheel motors 21 to 24 mounted on the wheels.

A cooling system for a vehicle driven by in-wheel motors according to embodiments of the present disclosure was described above and a single water pump is installed in the embodiments. However, an assistant water pump may be further installed to increase and secure the flow rate of cooling water at positions where flow resistance of cooling water is large in the cooling water circulation line.

For example, in the cooling circuit in which the inverters 10 and 11 and the in-wheel motors 21 to 24 are all connected in series as in the first embodiment, an assistant water pump may be installed in the cooling water circulation line 100 at the front end of the rear-wheel inverter 11, that is, the cooling water circulation line 100 connected to the cooling water channel inlet of the rear-wheel inverter 11.

Alternatively, in the cooling circuit in which the inverters 10 and 11 and the in-wheel motors 21 to 24 are connected in parallel and a plurality of diverging circulation lines 100a and 100b for parallel connection, an assistant water pump for cooling water may be installed in at least one circulation line selected from the plurality of diverging circulation lines 100a and 100b.

In this case, an assistant water pump for increasing and securing the flow rate of cooling water may be installed in the circulation line having relatively large flow resistance of the plurality of circulation lines 100a and 100b that diverge in parallel. For example, an assistant water pump may be installed in the diverging circulation line 100b at the front end of the rear-wheel inverter 11, that is, in the circulation line 100b connected to the cooling water channel inlet of the rear-wheel inverter 11.

Although embodiments of the present disclosure were described above in detail, the spirit of the present disclosure is not limited thereto and the present disclosure may be changed and modified in various ways on the basis of the basic concept without departing from the scope of the present disclosure described in the following claims.

What is claimed is:

1. A cooling system for a vehicle driven by in-wheel motors, the cooling system comprising:
    a cooling water channel provided in an in-wheel motor mounted on a wheel of a vehicle so that cooling water for cooling the in-wheel motor can pass through the cooling water channel;
    a cooling water channel provided in an inverter for driving and controlling the in-wheel motor so that cooling water for cooling the inverter can pass through the cooling water channel;
    a radiator provided to dissipate heat of cooling water that has cooled the in-wheel motor and the inverter by passing the cooling water;
    a cooling water circulation line connected such that cooling water can circulate between the cooling water channel of the in-wheel motor, the cooling water channel of the inverter, and the radiator; and
    a water pump configured to circulate cooling water through the cooling water circulation line by pumping cooling water in the cooling water circulation line.

2. The cooling system of claim 1, wherein the cooling water channels of at least some in-wheel motors of a plurality of in-wheel motors mounted on a plurality of wheels, respectively, are connected with each other in series by the cooling water circulation line in the vehicle, and cooling water sequentially passes through those in-wheel motors so connected in series.

3. The cooling system of claim 2, wherein the cooling water channels provided in the plurality of in-wheel motors, respectively, are all connected with each other in series by the cooling water circulation line, and cooling water circulating along the cooling water circulation line sequentially passes through all of the plurality of in-wheel motors.

4. The cooling system of claim 3, wherein the cooling water channels of a plurality of inverters for driving and controlling the plurality of in-wheel motors, respectively, are connected with each other in series by the cooling water circulation line, and cooling water sequentially passes through the inverters connected in series.

5. The cooling system of claim 4, wherein the cooling water channels of the plurality of in-wheel motors and the cooling water channels of the plurality of inverters are all connected with each other in series by a cooling water circulation line, and cooling water sequentially passes through the inverters and the in-wheel motors connected in series.

6. The cooling system of claim 2, wherein the cooling water channels of the other in-wheel motors except for the at least some in-wheel motors of the plurality of in-wheel motors are connected in series by a separate cooling circulation line diverging from the cooling water circulation line, and cooling water sequentially passes through the other in-wheel motors connected in series.

7. The cooling system of claim 6, wherein the cooling water channels of the at least some in-wheel motors and the cooling water channels of the other in-wheel motors are connected in parallel for the radiator by the diverging cooling water circulation line, and cooling water that has passed through the radiator is distributed to flow to the in-wheel motors connected in parallel by the diverging cooling water circulation line.

8. The cooling system of claim 6, wherein the at least some in-wheel motors include an in-wheel motor mounted on a left wheel of front wheels of the vehicle and an in-wheel motor mounted on a right wheel of the front wheels of the vehicle, and
the other in-wheel motors include an in-wheel motor mounted on a left wheel of rear wheels of the vehicle and an in-wheel motor mounted on a right wheel of the rear wheels of the vehicle.

9. The cooling system of claim 8, wherein the cooling water channels of a plurality of inverters for driving and controlling the plurality of in-wheel motors, respectively, are connected in series by the cooling water circulation line, and cooling water sequentially passes through the inverters connected in series.

10. The cooling system of claim 9, wherein the plurality of inverters includes:
a front-wheel inverter configured to drive and control the in-wheel motor on the left wheel of the front wheels of the vehicle and the in-wheel motor on the right wheel of the front wheels; and
a rear-wheel inverter configured to drive and control the in-wheel motor on the left wheel of the rear wheels of the vehicle and the in-wheel motor on the right wheel of the rear wheels.

11. The cooling system of claim 10, wherein a cooling circulation line at rear ends of the plurality of inverters connected in series is divided into two circulation lines,
one of the two diverging circulation lines is connected to the at least some in-wheel motors, and
another one of the two diverging circulation lines is connected to the other in-wheel motors.

12. The cooling system of claim 6, wherein the cooling water channels of the inverters configured to drive and control the at least some in-wheel motors are connected in series with the cooling water channels of the at least some in-wheel motors by a cooling circulation line to sequentially pass cooling water, and
the cooling water channels of the inverters configured to drive and control the other in-wheel motors are connected in series with the cooling water channels of the other in-wheel motors by a cooling water circulation line to sequentially pass cooling water.

13. The cooling system of claim 12, wherein the at least some in-wheel motors include an in-wheel motor mounted on a left wheel of front wheels of the vehicle and an in-wheel motor mounted on a right wheel of the front wheels of the vehicle, and
the other in-wheel motors include an in-wheel motor mounted on a left wheel of rear wheels of the vehicle and an in-wheel motor mounted on a right wheel of the rear wheels of the vehicle.

14. The cooling system of claim 13, wherein the cooling water circulation lines connected in series of the at least come in-wheel motors and the inverters and the cooling water circulation lines connected in series of the other in-wheel motors and the inverters are connected in parallel for the radiator by the diverging cooling water circulation line, and
cooling water that has passed through the radiator is distributed to flow the in-wheel motors and the inverters connected in parallel by the diverging cooling water circulation line.

15. The cooling system of claim 1, wherein the cooling water channels of a plurality of in-wheel motors mounted on a plurality of wheels, respectively, are all connected in parallel for the radiator by a diverging cooling water circulation line, and cooling water that has passed through the radiator is distributed to flow to the in-wheel motors connected in parallel by the diverging cooling water circulation line.

16. The cooling system of claim 15, wherein the cooling water channels of a plurality of inverters configured to drive and control the plurality of in-wheel motors are connected in series by the cooling water circulation line such that cooling water sequentially passes through the plurality of inverters, and
cooling water that has passed through the plurality of inverters connected in series is distributed to flow to the in-wheel motors connected in parallel.

17. The cooling system of claim 16, wherein the cooling water channel of the in-wheel motors are respectively connected in series with the cooling water channels of inverters mounted on the wheels with the in-wheel motors, respectively, to drive and control the in-wheel motors, respectively, and cooling water sequentially passes the cooling water channel of the inverter and the cooling water channel of the in-wheel motor on each of the wheels.

18. The cooling system of claim 1, wherein the cooling water channel of the in-wheel motor and the cooling water channel of the inverter are connected in series by the cooling water circulation line, and the cooling water passes through the cooling water channel of the inverter and then passes through the cooling water channel of the in-wheel motor.

19. The cooling system of claim 1, wherein a connection line diverges from a cooling water circulation line at a front end of the radiator through which cooling water, which has passed through the cooling water channels of the inverter and the in-wheel motor, flows, and is connected to a chiller provided pass an air-conditioning refrigerant,
a multi-way valve of which an opening state is controlled by a controller is installed at a point where the connection line diverges from the cooling water circulation line, and
a low-temperature refrigerant flowing inside through an expansion valve and high-temperature cooling water flowing inside through the multi-way valve and the connection line exchange heat with each other at the chiller.

20. The cooling system of claim 19, wherein a cooling water circulation line of a battery cooling circuit configured to cool a battery is connected to the chiller, and cooling water flowing along the cooling water circulation line of the battery cooling circuit and the air-conditioning refrigerant exchange heat with each other at the chiller.

* * * * *